(12) United States Patent
Schaufler

(10) Patent No.: US 8,244,407 B2
(45) Date of Patent: Aug. 14, 2012

(54) METHOD FOR ACTUATING A HYDRAULIC SERVO SYSTEM

(75) Inventor: Mario Schaufler, Kehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 826 days.

(21) Appl. No.: 12/315,976

(22) Filed: Dec. 6, 2008

(65) Prior Publication Data
US 2010/0258192 A1 Oct. 14, 2010

Related U.S. Application Data

(60) Provisional application No. 61/055,626, filed on Dec. 6, 2007.

(51) Int. Cl.
*G05D 16/00* (2006.01)

(52) U.S. Cl. .................................. 700/301; 137/625.64

(58) Field of Classification Search .................. 700/301, 700/302; 192/54.2, 48.601; 137/625.24; 290/40 C
See application file for complete search history.

(56) References Cited

U.S. PATENT DOCUMENTS

| | | | | |
|---|---|---|---|---|
| 3,757,823 | A * | 9/1973 | Knutson | 137/625.64 |
| 4,316,486 | A * | 2/1982 | Tandrup et al. | 137/625.64 |
| 5,896,890 | A * | 4/1999 | Bourkel et al. | 137/625.63 |
| 7,053,498 | B1 * | 5/2006 | Boisvert et al. | 290/40 R |
| 7,459,800 | B2 * | 12/2008 | Boisvert et al. | 290/40 C |
| 2010/0097038 | A1 * | 4/2010 | Boisvert et al. | 322/34 |

* cited by examiner

*Primary Examiner* — Dave Robertson
(74) *Attorney, Agent, or Firm* — Alfred J. Mangels

(57) ABSTRACT

A method for actuating a hydraulic servo system with a proportional valve that converts an electrical control signal into a hydraulic pilot pressure with which the hydraulic servo system is actuated. An additional impulse is fed to the proportional valve at the beginning of a desired change of the electrical control signal.

10 Claims, 2 Drawing Sheets

METHOD FOR ACTUATING A HYDRAULIC SERVO SYSTEM

BACKGROUND OF THE INVENTION

The present invention relates to a method for actuating a hydraulic servo system utilizing a proportional valve that converts an electrical control signal into a hydraulic pilot pressure with which the hydraulic servo system is actuated.

An object of the present invention is to improve the response behavior of the hydraulic servo system, particularly at low operating temperatures.

SUMMARY OF THE INVENTION

Briefly stated, in accordance with one aspect of the present invention, a method is provided for actuating a hydraulic servo system utilizing a proportional valve that converts an electrical control signal into a hydraulic pilot pressure with which the hydraulic servo system is actuated. The benefits of the present invention are achieved by feeding an additional electrical impulse to the proportional valve at the beginning of a desired change of the electrical control signal. With the additional impulse before the actual actuation of the proportional valve, the response time of the hydraulic system is reduced significantly.

A preferred exemplary embodiment of the method is characterized in that the additional impulse includes a current impulse whose level and duration are adapted as a function of the system temperature. As soon as the system temperature falls below a specified temperature of, for example, zero degrees Celsius, a current impulse with a certain level and duration is fed to the proportional valve before a desired change of the electrical control signal.

Another preferred exemplary embodiment of the method is characterized in that the additional impulse is executed as a square-wave impulse. In a square-wave impulse the current first rises abruptly, then remains constant for a short time, and drops again equally abruptly.

Another preferred exemplary embodiment of the method is characterized in that the actual pressure in the hydraulic servo system is measured when the proportional valve is actuated, and is compared to a desired pressure. The actual pressure can be detected using an existing pressure sensor.

Another preferred exemplary embodiment of the method is characterized in that an additional impulse is fed to the proportional valve before a desired change of the electrical control signal if a deviation of the actual pressure from the desired pressure exceeds a defined deviation value. The desired pressure and the value of the corresponding impulse can be stored in a characteristic map.

Another preferred exemplary embodiment of the method is characterized in that the actual pressure in the hydraulic servo system is measured when the proportional valve is actuated with and without an additional impulse. The actual pressure values can be detected using an existing pressure sensor.

Another preferred exemplary embodiment of the method is characterized in that the measured actual pressure values or actual pressure patterns are compared to each other with and without an additional impulse. The comparison can be performed with the aid of an existing control device.

Another preferred exemplary embodiment of the method is characterized in that the additional impulse is fed to the proportional valve before a desired change of the electrical control signal if deviations of the actual pressure values or actual pressure patterns from corresponding desired values exceed defined values. The deviations of the actual pressure values or actual pressure patterns from the corresponding desired values are directly related to the system temperature.

Another preferred exemplary embodiment of the method is characterized in that the proportional valve is actuated with a ramp. The ramp makes it possible for example to operate a starting clutch without jerking.

Another preferred embodiment of the method is characterized in that the hydraulic servo system includes a clutch and/or a variable speed drive unit of a motor vehicle including a belt-driven conical-pulley transmission having a variably adjustable transmission ratio. Such transmissions are also referred to as CVT transmissions (CVT—continuously variable transmission).

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMODIMENTS

An electrically operated proportional valve is utilized in hydraulic controls for CVT transmissions to convert an electrical signal into a hydraulic pilot pressure. With the aid of the pilot pressure a servo system is then actuated, which can include, for example, a spool and a starting clutch.

Figure 1:
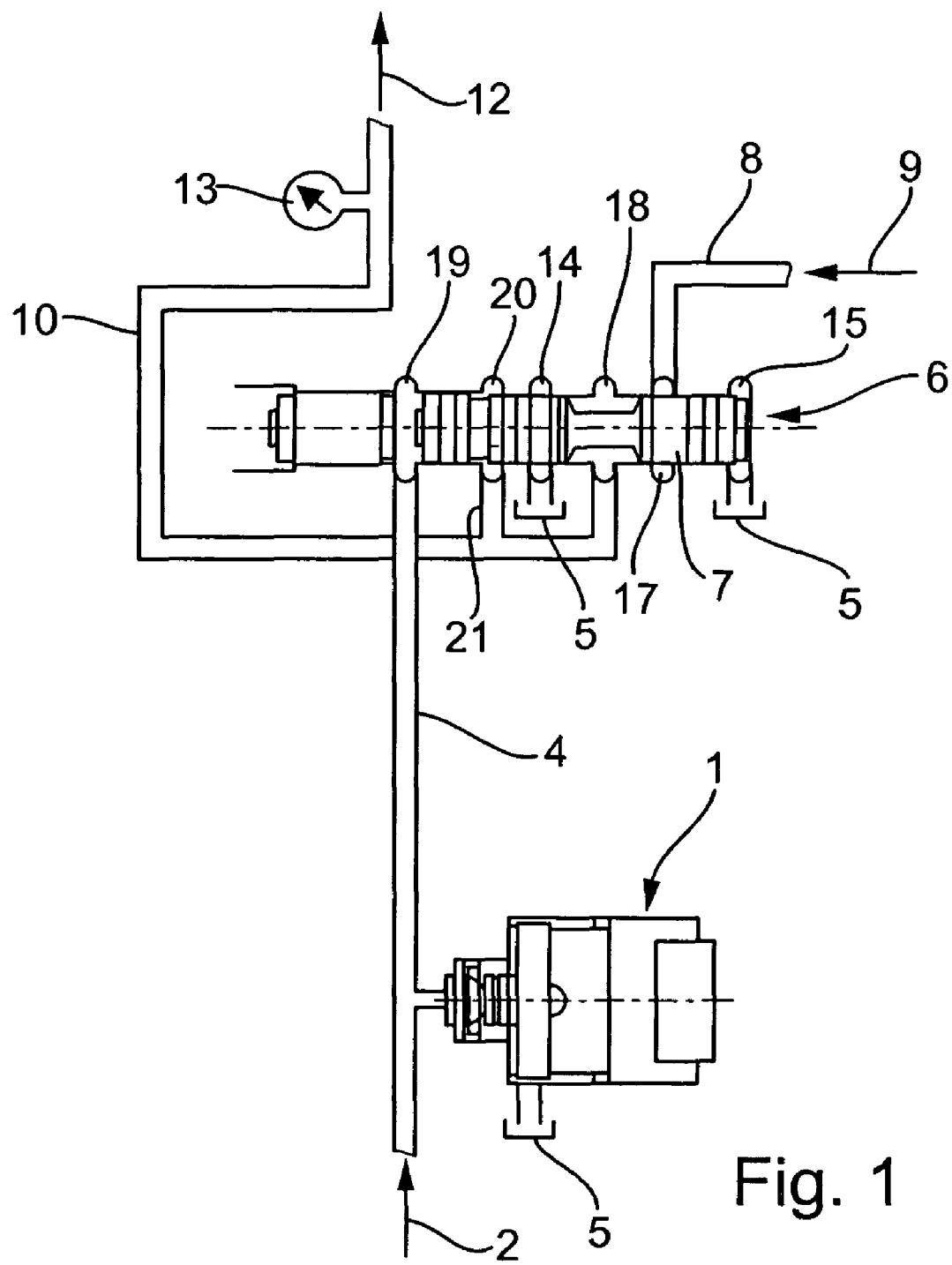
FIG. 1 shows a detail diagram of a portion of a hydraulic circuit of a hydraulic system for controlling a belt-driven conical-pulley transmission.

In FIG. 1 a proportional valve 1 is connected to a pilot pressure line 4, which is connected at its free end, i.e., the lower end in FIG. 1, to a pilot pressure supply source which is indicated by an arrow 2. A constant pilot pressure of, for example, 5 bar is provided in pilot pressure line 2 by way of pilot pressure supply source 2.

If the proportional valve is actuated electrically, then the pilot pressure in pilot pressure line 4 can be relieved through proportional valve 1 into a tank 5. Thus, the pilot pressure in pilot pressure line 4 can be lowered specifically to values between 0 and 5 bar with the aid of proportional valve 1.

The other end of pilot pressure line 4, the upper end in FIG. 1, is connected to a servo valve 6 with a spool 7. An additional pressure supply source, indicated by an arrow 9, is connected through a hydraulic line 8 to servo valve 6. The additional pressure supply source supplies a pressure that is significantly greater than a pressure that can be set with the aid of servo valve 6 in a hydraulic line 10, which is also connected to servo valve 6.

Another arrow 12 indicates that the free end of hydraulic line 10, the upper end in FIG. 1, is connected to a servo system. In addition to servo valve 6 with spool 7 and hydraulic line 10, which is also referred to as the servo hydraulic line, the servo system includes, for example, a starting clutch (not shown) that is actuated hydraulically through servo valve 6. The pressure in servo hydraulic line 10 is detected with the aid of a pressure sensor 13.

Spool 7 of servo valve 6 is pressurized with the pilot pressure at one end, in FIG. 1 the left end, through pilot pressure line 4. At its other end, the right end in FIG. 1, spool 7 is relieved or vented into tank 5. Servo valve 6 includes a total of six chambers 14, 15, 17, 18, 19, 20 with connections, which are explained below. Tank 5 is connected to chambers 14, 15. Hydraulic line 8 is connected to chamber 17. Servo hydraulic line 10 is connected to chamber 18. Pilot pressure line 4 is connected to chamber 19. A return line 21 which discharges into servo hydraulic line 10 is connected to chamber 20.

A return surface formed on spool 7 is pressurized via return line 21 and chamber 20. The size of that return surface is coordinated with another pressure surface on spool 7, which is pressurized via chamber 18. Hydraulic line 8 can be connected through servo valve 6 to servo hydraulic line 10 or to tank 5, depending upon the pilot pressure in pilot pressure line 4 that is controlled by proportional valve 1, in order to provide a desired pressure or pressure pattern in servo hydraulic line 10.

In investigations conducted in conjunction with the present invention it has been found that at temperatures in the minus range an undesired delay occurs in converting the electrical control signal of proportional valve 1 to the hydraulic pilot pressure in pilot pressure line 4. The invention provides a way of reducing that undesired time lag between the electrical control signal and the hydraulic response of proportional valve 1, or of eliminating it entirely.

Figure 2:
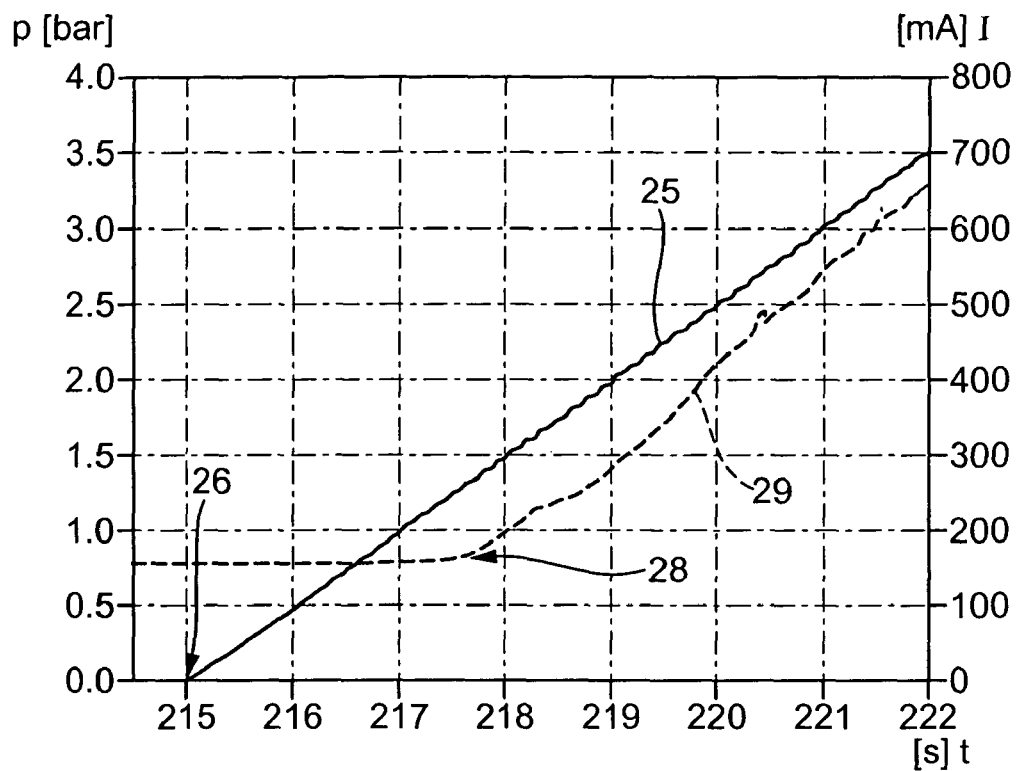
FIG. 2 is a graph showing a pilot pressure and a corresponding current signal plotted over time during actuation of a conventional proportional valve.

In FIG. 2, the pilot pressure p, in bar, in the pilot pressure line (4 in FIG. 1) and the current I in milliamperes with which the proportional valve (1 in FIG. 1) is actuated are plotted over time t in seconds in a Cartesian coordinate system. The current I is applied in the form of a ramp signal 25 to actuate the starting clutch. The beginning 26 of current ramp signal 25 occurs at about 215 seconds. At point 28 it can be seen that the corresponding pilot pressure ramp signal 29 does not begin until after about 217 seconds. The associated time delay is undesired.

Figure 3:
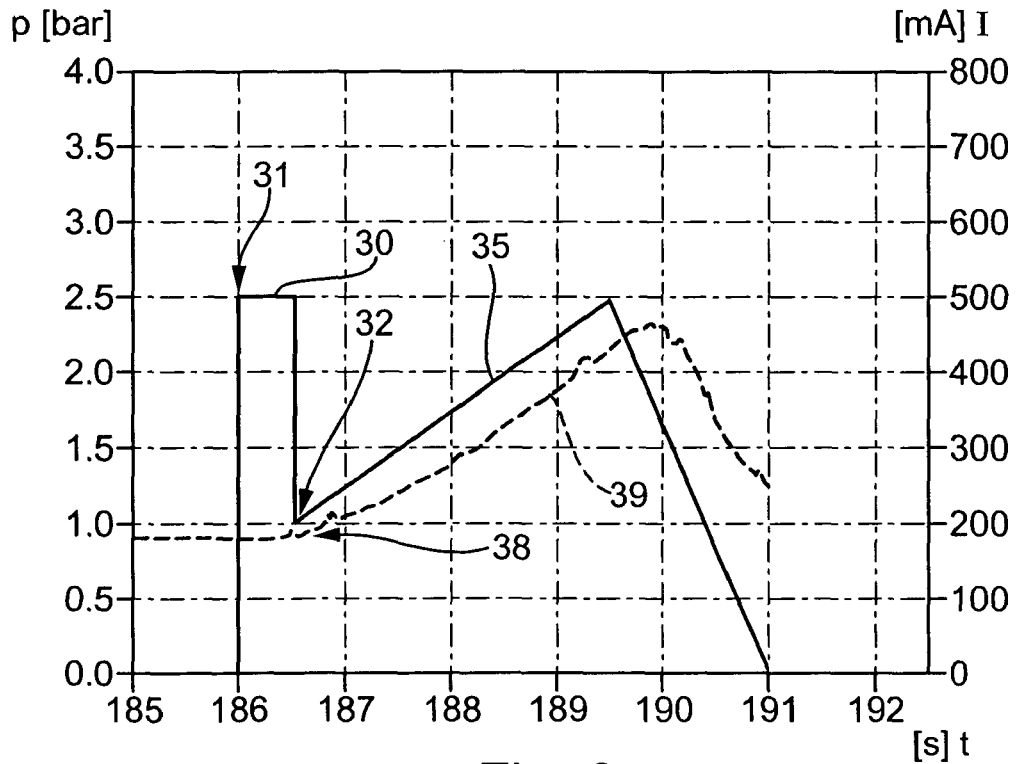
FIG. 3 is a graph similar to FIG. 2 showing a pilot pressure and a corresponding current signal plotted over time during actuation of a proportional valve in accordance with an embodiment of the present invention.

FIG. 3 shows in a similar coordinate diagram how a current ramp signal 35 is applied to the proportional valve (1 in FIG. 1) before the beginning 32 of current ramp signal 35, at 186.56 seconds, through a suitable current impulse 30 which begins after about 186 seconds. As indicated at point 31, current impulse 30 has a value of about 500 milliamperes and lasts about 0.5 seconds. At point 38 it can be seen that the corresponding pilot pressure ramp signal 39 begins at almost the same time, i.e., at 186.60 seconds. The current impulse 30 before the beginning 32 of the change of current ramp signal 35 of the proportional valve enables the response time of the system to be reduced significantly.

According to another aspect of the present invention, the necessary level and duration of control impulse 30 are adapted as a function of the system temperature. With a CVT control that can be done by measuring the actual pressure at the pressure sensor (13 in FIG. 1) during an actuation by a current ramp signal, for example, and comparing it with the same current ramp signal preceded by a current impulse.

An alternative possible solution involves determining the difference between the desired pressure, which can be calculated from the control signal of the proportional valve, and the actual pressure, which can be measured by way of pressure sensor 13. Depending upon that difference, a current impulse or offset can be added to the desired current, which reduces the difference between desired and actual pressure.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for actuating a hydraulic servo system with the aid of a proportional valve that converts an electrical control signal into a hydraulic pilot pressure with which the hydraulic servo system is actuated, said method comprising the steps of: providing a first electrical control signal to the proportional valve, and feeding an additional electrical control signal impulse to the proportional valve before a beginning of a desired change of the first electrical control signal in order to reduce a time delay between a desired hydraulic pilot pressure increase and an actual hydraulic pilot pressure increase.

2. A method in accordance with claim 1, including the step of feeding the additional electrical control signal impulse as a current impulse, and adjusting a level and duration of the current impulse as a function of a system temperature.

3. A method in accordance with claim 1, wherein the additional electrical control signal impulse is a square-wave impulse.

4. A method in accordance with claim 1, including the steps of: measuring an actual pressure in the hydraulic servo system when the proportional valve is actuated, and comparing the measured actual hydraulic pressure with a desired hydraulic pressure.

5. A method in accordance with claim 4, including the step of feeding the additional electrical control signal impulse to the proportional valve before a desired change of the first electrical control signal when a deviation of the actual hydraulic pressure in the hydraulic servo system from the desired hydraulic pressure exceeds a predetermined value.

6. A method in accordance with claim 1, including the step of measuring an actual pressure in, the hydraulic servo system when the proportional valve is actuated both with and without an additional impulse.

7. A method in accordance with claim 6, including the step of comparing the measured actual pressure values with each other both with and without an additional impulse.

8. A method in accordance with claim 7, including the step of feeding the additional electrical control signal impulse to the proportional valve before a desired change of the first electrical control signal when deviations of the measured actual hydraulic pressure values from corresponding desired hydraulic values exceed predetermined deviation values.

9. A method in accordance with claim 1, wherein the first electrical control signal provided to the proportional valve is a ramp signal.

10. A method in accordance with claim 1, wherein the hydraulic servo system includes at least one of a clutch and a variable speed drive unit of a belt-driven conical-pulley transmission having a variably adjustable transmission ratio.

* * * * *